United States Patent
Eto

(10) Patent No.: US 9,969,380 B2
(45) Date of Patent: May 15, 2018

(54) HYBRID VEHICLE CONTROL APPARATUS

(71) Applicant: Honda Motor Co., Ltd., Tokyo (JP)

(72) Inventor: Masashi Eto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 136 days.

(21) Appl. No.: 15/097,216

(22) Filed: Apr. 12, 2016

(65) Prior Publication Data

US 2016/0304079 A1    Oct. 20, 2016

(30) Foreign Application Priority Data

Apr. 17, 2015 (JP) ................. 2015-084613

(51) Int. Cl.
| | |
|---|---|
| *B60W 10/08* | (2006.01) |
| *B60W 10/06* | (2006.01) |
| *B60K 6/48* | (2007.10) |
| *B60W 10/02* | (2006.01) |
| *B60W 20/40* | (2016.01) |
| *B60L 11/00* | (2006.01) |

(52) U.S. Cl.
CPC ............... *B60W 10/08* (2013.01); *B60K 6/48* (2013.01); *B60W 10/02* (2013.01); *B60W 10/06* (2013.01); *B60W 20/40* (2013.01); *B60K 2006/4825* (2013.01); *B60W 2510/0638* (2013.01); *B60W 2510/0671* (2013.01); *B60W 2510/244* (2013.01); *B60W 2520/10* (2013.01); *B60W 2540/10* (2013.01); *B60W 2710/1055* (2013.01); *B60Y 2200/92* (2013.01); *B60Y 2300/182* (2013.01); *Y02T 10/6221* (2013.01); *Y02T 10/6252* (2013.01); *Y02T 10/6286* (2013.01); *Y10S 903/93* (2013.01); *Y10S 903/951* (2013.01)

(58) Field of Classification Search
CPC .. B60K 6/445; B60K 6/48; B60K 2006/4825; B60K 6/54; B60W 10/02; B60W 10/06; B60W 10/08; B60W 20/40; B60W 20/00
USPC ............... 701/22; 180/65.265, 65.235, 65.23
See application file for complete search history.

(56) References Cited

U.S. PATENT DOCUMENTS

| | | | |
|---|---|---|---|
| 2009/0093331 A1* | 4/2009 | Iwanaka | B60K 6/365 475/5 |
| 2015/0021110 A1* | 1/2015 | Ono | B60K 6/365 180/65.235 |
| 2016/0176391 A1* | 6/2016 | Sato | B60W 10/06 701/22 |

FOREIGN PATENT DOCUMENTS

JP    H102241 A    1/1998

* cited by examiner

*Primary Examiner* — Gertrude Arthur Jeanglaude
(74) *Attorney, Agent, or Firm* — Duft Bornsen & Fettig LLP

(57) ABSTRACT

In a hybrid vehicle control apparatus, driving of the vehicle is switched between driving modes including engine driving mode in which driving is to be powered by an internal combustion engine and electrical machine driving mode in which driving is to be powered by a rotating electrical machine, and required driving force in each of the driving modes in accordance with predetermined characteristics based on accelerator position and vehicle speed to control driving force of the vehicle to the calculated required driving force, when the driving mode is switched, driving force of the vehicle is controlled based on the required driving force of the driving mode before switched unless at least one of the accelerator position and the vehicle speed changes.

9 Claims, 22 Drawing Sheets

HYBRID VEHICLE CONTROL APPARATUS

CROSS-REFERENCE TO RELATED APPLICATION

This application is based upon and claims the benefit of priority from Japanese Patent Application No. 2015-084613 filed on Apr. 17, 2015, the contents of which are incorporated herein by reference.

FIELD OF THE INVENTION

This invention relates to a hybrid vehicle control apparatus, and particularly to control at time of switching driving mode.

BACKGROUND OF THE INVENTION

Control apparatuses are well known for use in hybrid vehicles equipped with an internal combustion engine and a rotating electrical machine as onboard power sources and configured to respond to predetermined switching conditions by switching among driving modes comprising at least an engine driving mode in which driving is to be powered by the internal combustion engine and an electrical machine driving mode in which driving is to be powered by the rotating electrical machine, and the technology set out in Japanese Laid-Open Patent Publication No. H10 (1998)-2241 can be cited as an example of such a control apparatus.

The technology of the aforesaid publication prohibits driving mode switching during gear shifting for changing gear ratio, thereby preventing shock caused by performing operating mode switching and gear shift control simultaneously.

SUMMARY OF THE INVENTION

Most hybrid vehicles are configured to calculate required driving force in each of engine driving mode and electrical machine driving mode in accordance with predetermined characteristics based on accelerator position and vehicle speed and to control vehicle driving force to the calculated required driving force.

At this time, in a case where the driving forces generated by the internal combustion engine and the rotating electrical machine are not exactly equal even though the vehicle speed and accelerator position are the same, the operator may have an unnatural feeling due to a change in vehicle driving force accompanying change in required driving force when the driving mode is switched.

The configuration according to the technical concept set out in the aforesaid publication is adapted to prohibit driving mode switching during gear shifting that changes the gear ratio, thereby preventing occurrence of shock due to simultaneous performance of operating mode switching and gear shift control, but it is limited to this and offers no countermeasure with respect to the unnatural feeling of the operator owing to a change in vehicle driving force along with required driving force change when the driving mode is switched.

Therefore, the object of this invention is to overcome the aforesaid problem by providing a hybrid vehicle control apparatus adapted to decrease any unnatural feeling given to the operator by change in vehicle driving force accompanying required driving force change when switching between engine driving mode in which driving is to be powered by an internal combustion engine and an electrical machine driving mode in which driving is to be powered by a rotating electrical machine.

This invention is configured to have a control apparatus for a hybrid vehicle mounted with an internal combustion engine and a rotating electrical machine as onboard power sources, having a mode switching unit that switches driving mode of the vehicle between driving modes including engine driving mode in which driving is to be powered by the engine and electrical machine driving mode in which driving is to be powered by the rotating electrical machine in accordance with predetermined switching conditions; and a driving force control unit that calculates required driving force in each of the engine driving mode and the electrical machine driving mode in accordance with predetermined characteristics based on accelerator position and vehicle speed and controls the driving force of the vehicle to the calculated required driving force; wherein the driving force control unit controls the driving force of the vehicle, when the driving mode is switched by the mode switching unit, based on the required driving force of the driving mode before switched unless at least one of the accelerator position and the vehicle speed changes.

In this invention, it is configured to control the driving force of the vehicle based on the required driving force of the driving mode before switched unless at least one of the accelerator position and the vehicle speed changes when the driving mode is switched. With this, by controlling driving force of the vehicle based on the required driving force of the driving mode before switched unless at least one of the accelerator position and vehicle speed changes, in other words, by controlling driving force of the vehicle based on the required driving force of the driving mode after switched when at least one of the accelerator position and vehicle speed changes, it becomes possible to decrease any unnatural feeling given to the operator by change in vehicle driving force accompanying required driving force change driving mode switching.

Specifically, since the change of accelerator position must be caused by the operator's accelerator manipulation and the operator must feel the change of vehicle speed by himself/herself, by changing the required driving force when at least one of the accelerator position and vehicle speed changes, it becomes possible to decrease unnatural feeling given to the operator even when the driving forces generated by the internal combustion engine and the rotating electrical machine are not equal even though the vehicle speed and accelerator position are the same so that the driving force of the vehicle changes due to change in the required driving force.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

An embodiment for implementing the hybrid vehicle control apparatus according to this invention is explained with reference to the attached drawings in the following.

Figure 1:
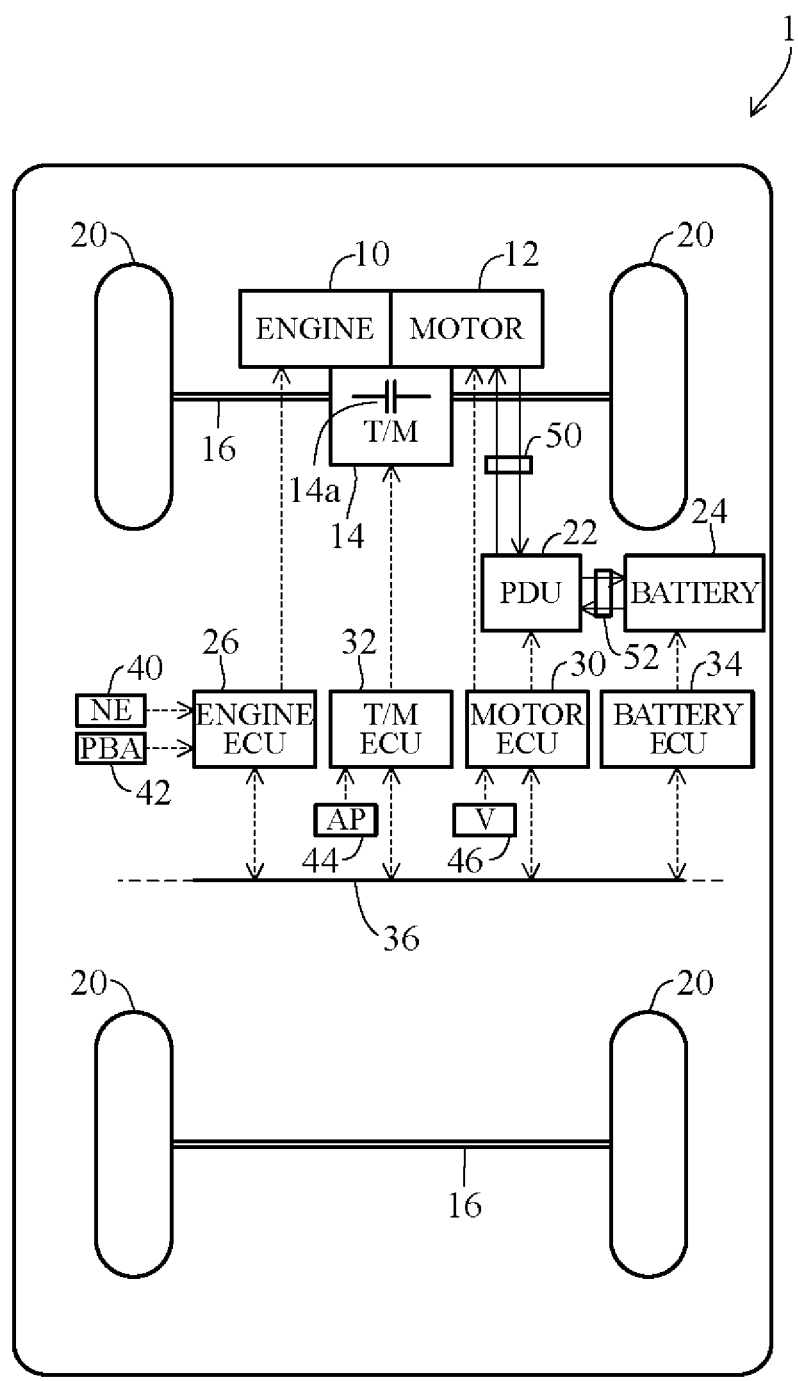
FIG. 1 is an overall diagram schematically illustrating a hybrid vehicle control apparatus according to an embodiment of this invention.

FIG. 1 is an overall diagram schematically illustrating a hybrid vehicle control apparatus according to an embodiment of this invention.

Reference symbol 1 in FIG. 1 designates a hybrid vehicle (hereinafter called "vehicle"), and an internal combustion engine (hereinafter called "engine") 10 and a rotating electrical machine (hereinafter called "motor") 12 are mounted in the vehicle 1 as onboard power sources. The engine 10 is, for example, a gasoline injection, spark-ignition type engine having multiple cylinders.

The motor 12 is, for example, a brushless motor or a synchronous motor that operates as an electric motor when conducting current and that when rotating along with the engine 10, for instance, functions as a generator with regeneration capability for converting kinetic energy produced by the rotation to electric energy and outputting the converted electric energy.

The engine 10 and motor 12 are connected to a transmission 14. The transmission 14 is a twin-clutch automatic transmission, and a configuration is adopted whereby the output shafts of the engine 10 and motor 12 are connected through a clutch 14a to a transmission input shaft (not shown) and the output of either the engine 10 or the motor 12 is inputted to the transmission 14.

The transmission 14 converts speed and torque of the output power received from the engine 10 (or motor 12) and transmits the converted output power through a driveshaft 16 to wheels 20 comprising driven wheels (front wheels) and non-driven wheels (rear wheels), thereby driving the vehicle 1.

The motor 12 is connected through a power drive unit (PDU) 22 to a battery 24. The PDU 22, which is equipped with an inverter, converts direct current (power) supplied (discharged) from the battery 24 to alternating current and supplies it to the motor 12, and converts alternating current generated by the regenerative action of the motor 12 to direct current and supplies it to the battery 24.

The vehicle 1 is equipped with an engine control unit (engine ECU) 26 for controlling operation of the engine 10, a motor control unit (motor ECU) 30 for controlling operation of the motor 12, a transmission control unit (transmission ECU) 32 for controlling operation of the transmission 14, and a battery control unit (battery ECU) 34 for, inter alia, managing charging and discharging of the battery 24. The aforesaid engine ECU 26 and other ECUs (electronic control units) are all microcomputers, each of which is equipped with a CPU, ROM and input/output I/O, and are intercommunicatably connected via a communication bus 36.

As indicated in FIG. 1, a crank angle sensor 40 installed at an appropriate position, such as near a cam shaft (not shown) of the engine 10, outputs a signal indicating engine speed NE once every predetermined piston crank angle position, and a manifold absolute pressure sensor 42 provided in an air-intake system at a suitable position downstream of a throttle valve (not shown) outputs a signal proportional to manifold absolute pressure PBA inside an air-intake pipe (engine load). The outputs of the crank angle sensor 40 and manifold absolute pressure sensor 42 are sent to the engine ECU 26.

Further, an accelerator position sensor 44 provided near an accelerator pedal (not shown) on the floor at the operator's seat of the vehicle 1 outputs a signal proportional to accelerator position AP corresponding to the amount of position or depression of the accelerator pedal by the operator, and a vehicle speed sensor 46 provided near the driveshaft 16 outputs a signal indicating vehicle speed (travel speed of the vehicle 1) V. In addition, rotational speed sensors (not shown) provided at input shafts or other rotating shafts of the transmission 14 output various signals indicating rotational speed. The outputs of the accelerator position sensor 44 and the like are sent to the transmission ECU 32.

Current-voltage sensors 50, 52 provided one between the motor 12 and PDU 22 and the other between the PDU 22 and battery 24 output signals indicating current conducting state of the motor 12 and charge-discharge state of the battery 24. The outputs of the current-voltage sensors 50, 52 are sent to the motor ECU 30 and the battery ECU 34, respectively.

Although numerous sensors in addition to those mentioned above are also installed, they are omitted in the drawings and not explained here. The engine ECU 26, motor ECU 30, transmission ECU 32, and battery ECU 34 control operation of the engine 10, motor 12, transmission 14, and battery 24 based on the received sensor outputs. For example, the battery ECU 34 calculates SOC (State Of Charge) of the battery 24 based on the sensor outputs and manages charging-discharging of the battery 24 thereon.

In addition, the engine ECU 26 functions as a mode switching unit (or mode switching means) that, in accordance with predetermined switching conditions, namely in accordance with, inter alia, driving state of the vehicle 1 and charge-discharge state of the battery 24, switches driving mode of the vehicle 1 between driving modes including engine driving mode in which driving is to be powered by the engine 10 (engine driving mode or ENG driving mode, hereinafter abbreviated as "ENG-driving") and motor driving mode in which driving is to be powered by the motor 12 (electrical machine driving mode or EV driving mode, hereinafter abbreviated as "EV-driving"), and more exactly among driving modes including in addition to ENG-driving and EV-driving a driving mode in which driving is to be powered by the engine 10 and motor 12 (hybrid driving mode), and functions as a driving force control unit (or driving force control means) that calculates required driving force in each of ENG-driving and EV-driving in accordance with predetermined characteristics based on accelerator position AP and vehicle speed V and controls driving force of the vehicle 1 to the calculated required driving force.

This is explained in the following.

Figure 2:
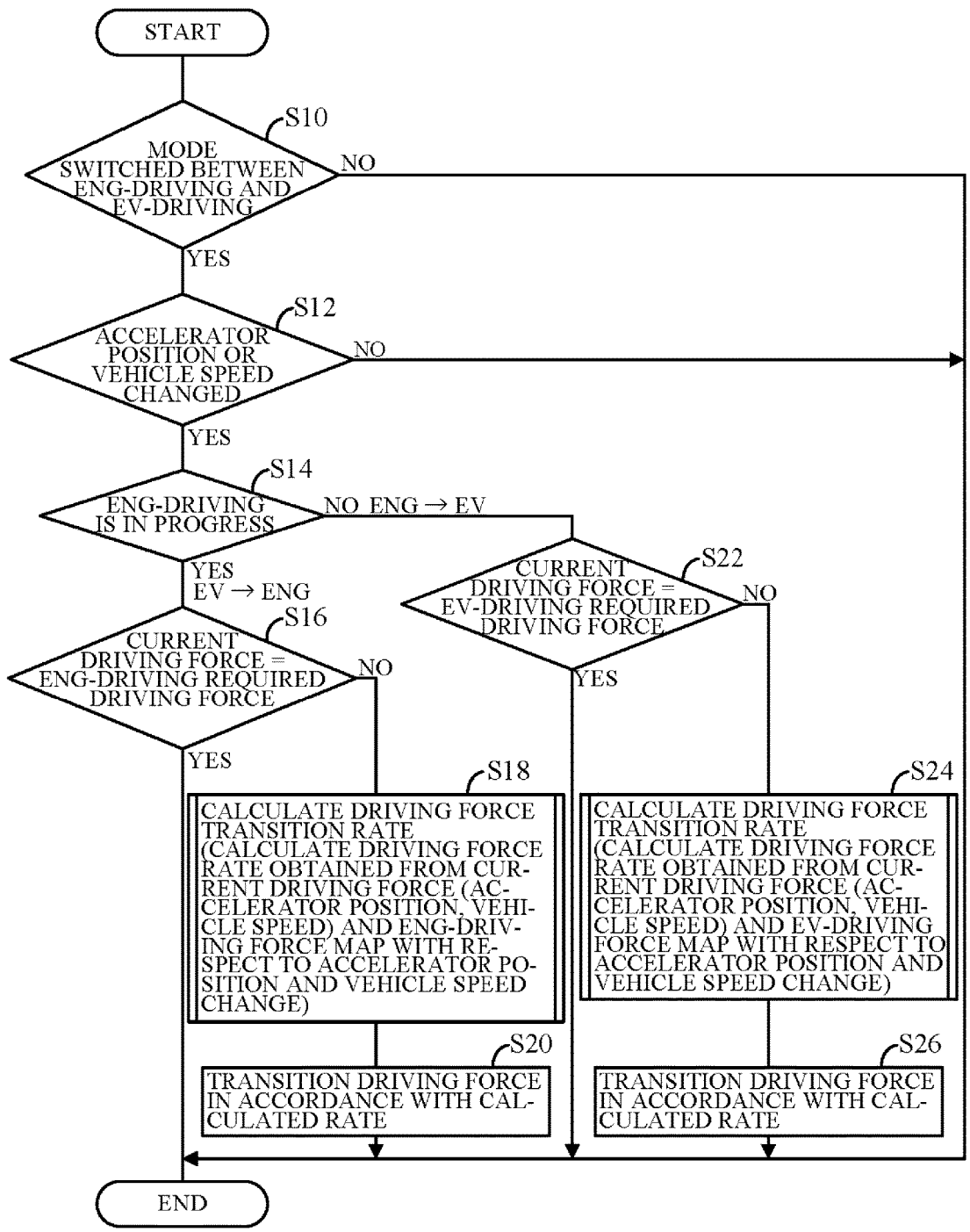
FIG. 2 is a flowchart showing operation of the apparatus shown in FIG. 1.

FIG. 2 explains the aforesaid operations of the engine ECU 26, namely operations of the hybrid vehicle control apparatus according to this embodiment.

First, in S10, it is determined whether there is a switch of driving mode from ENG-driving to EV-driving or vice versa. When the result in S10 is NO, subsequent processing is skipped, and when it is YES, i.e., when a switch of driving mode is determined, the program goes to S12, in which it is determined whether at least one of accelerator position AP and vehicle speed V changed.

When the result in S12 is NO, subsequent processing is skipped and required driving force of the vehicle 1 is calculated in accordance with the predetermined characteristic based on the required driving force of the driving mode before the switch using the accelerator position AP and vehicle speed V, and required driving force of the vehicle 1 is controlled to the calculated required driving force. Hereinafter, required driving force of ENG-driving is called ENG-driving required driving force and required driving force of EV-driving is called EV-driving required driving force.

On the other hand, when the result in S12 is YES, the program goes to S14, in which it is determined whether ENG-driving is in progress, i.e., whether EV-driving is switched to ENG-driving, and when the result is YES, the program goes to S16, in which it is determined whether current driving force, i.e., required driving force calculated from accelerator position AP and vehicle speed V in accordance the predetermined characteristics, is in agreement with ENG-driving required driving force.

When the result in S16 is NO, the program goes to S18, in which driving force transition rate (driving force increase/decrease rate) is calculated from a current driving force and ENG-driving force map, and goes to S20, in which driving force transition control is performed in accordance with the calculated driving force transition rate. On the other hand, when the result in S16 is YES, meaning that completion of such transition control is determined, subsequent processing is skipped.

Figure 3:
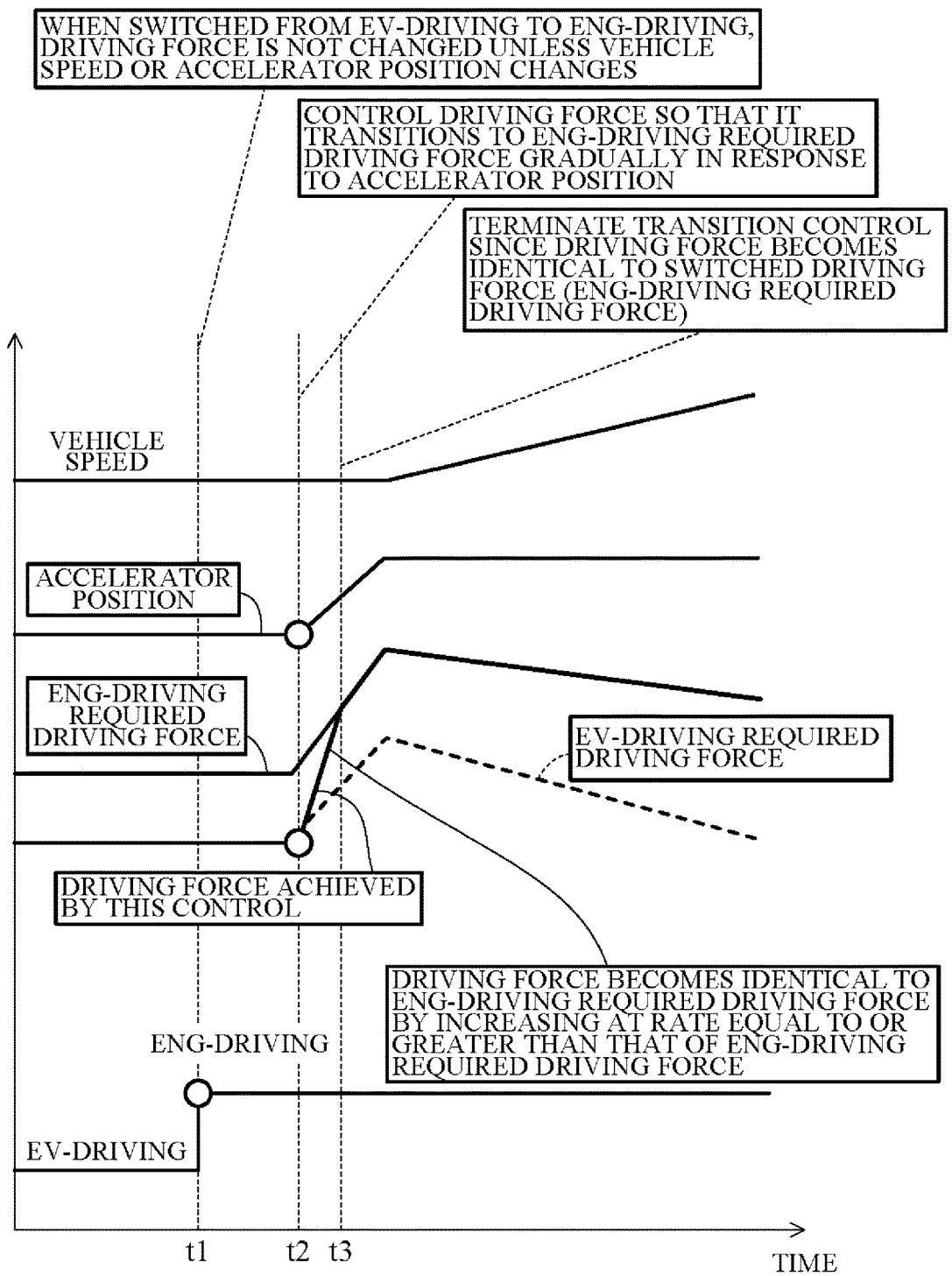
FIG. 3 is a time chart showing overview of driving force transition at the time of switching from EV-driving to ENG-driving in the apparatus shown in FIG. 1.

Turning to an explanation of the foregoing with reference to FIG. 3 onward, FIG. 3 is a time chart showing an overview of driving force transition at the time of switching from EV-driving to ENG-driving. In the following, ENG-driving required driving force is assumed to be larger than EV-driving required driving force. And in this specification, driving force increase/decrease rate is represented as an absolute value.

In FIG. 3, assuming that EV-driving is switched to ENG-driving at time t1, then in the illustrated example accelerator position AP or vehicle speed V does not change until time t2, so that EV-driving required driving force remains steady and driving force of the vehicle 1 is controlled accordingly.

On the other hand, from when accelerator position AP starts to change in the increase direction at time t2, transition control is implemented toward the after-switching ENG-driving required driving force. Specifically, since required driving force increases owing to increased accelerator position AP by the operator, required driving force is transitioned from EV-driving required driving force to ENG-driving required driving force while EV-driving required driving force is being increased at a rate equal to or greater than the increase rate of the ENG-driving required driving force.

Figure 4:
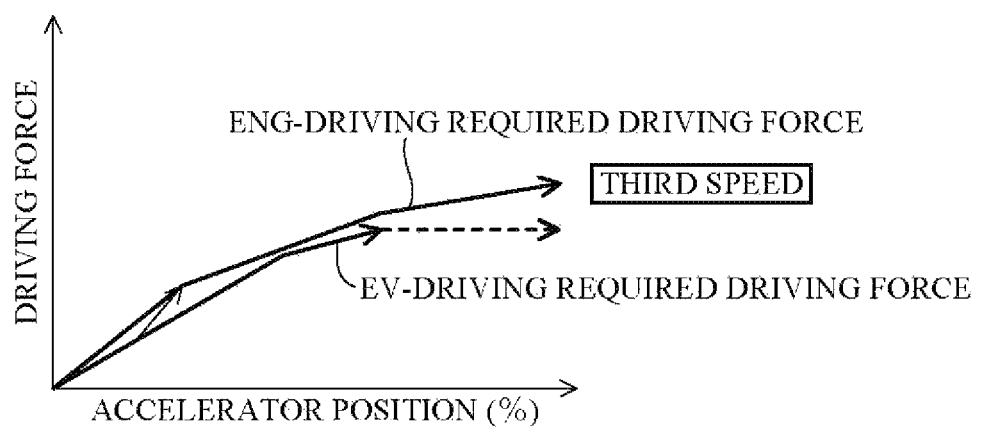
FIG. 4 is an explanatory diagram showing required driving force characteristics of an engine and a motor with respect to an accelerator position shown in FIG. 3 time chart.

In other words, as illustrated, by implementing a equal to or greater increase rate than the increase rate of the ENG-driving required driving force (i.e., a high increase rate), the required driving force can be rapidly and reliably be made to equal (match) the ENG-driving required driving force. FIG. 4 is an explanatory diagram showing required driving force characteristics of the engine 10 and motor 12 with respect to the accelerator position AP when the transmission 14 is in third speed.

As stated earlier, the two driving forces are not identical but by increasing the driving force maintained at the EV-driving required driving force toward the ENG-driving required driving force, the two can be made to coincide at time t3 as shown in FIG. 3. Therefore, the result in S16 of the flowchart of FIG. 2 becomes YES and the subsequent processing is skipped.

Figure 5:
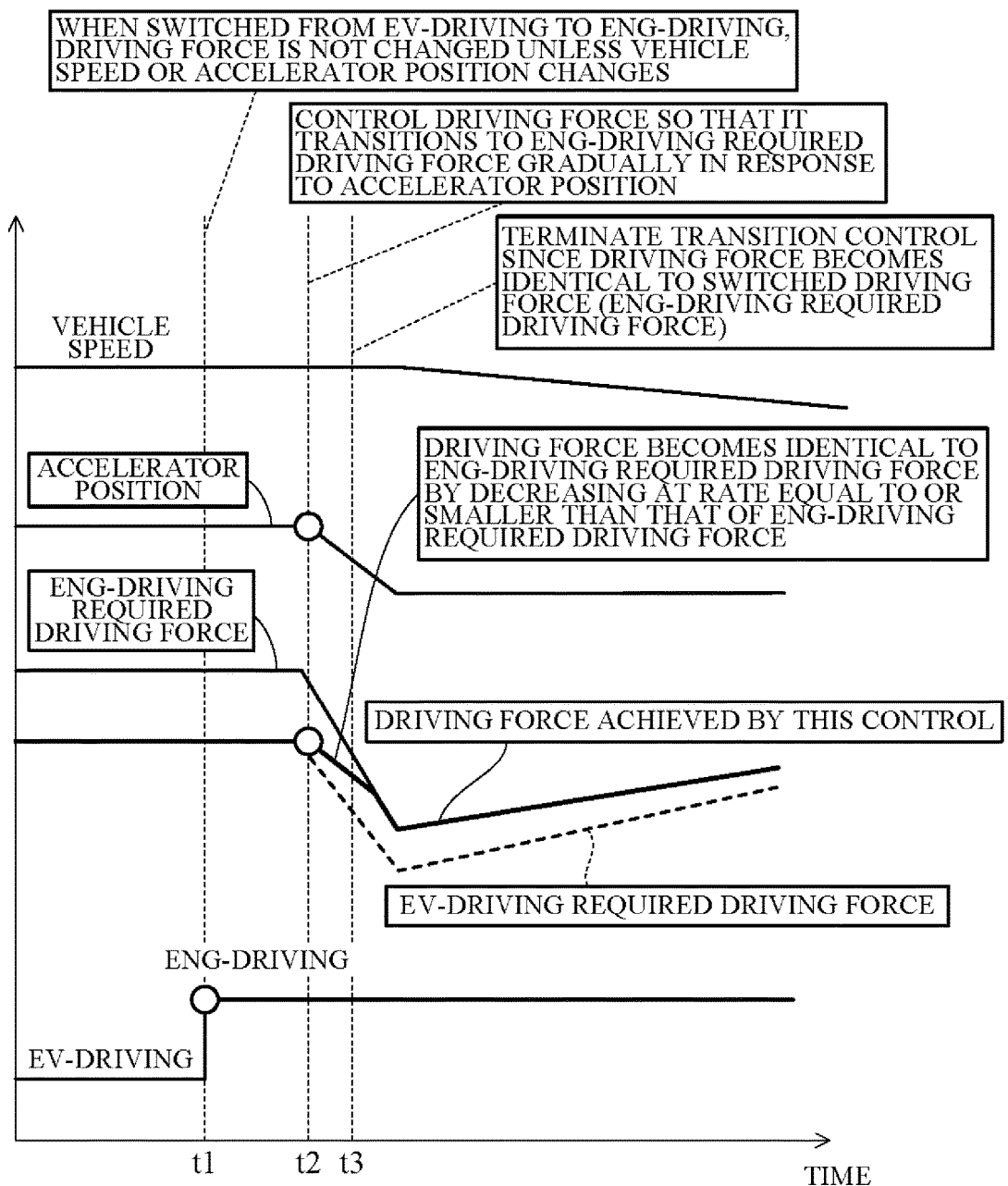
FIG. 5 is a time chart showing overview of driving force transition at the time of switching from EV-driving to ENG-driving in the apparatus shown in FIG. 1.
Figure 6:
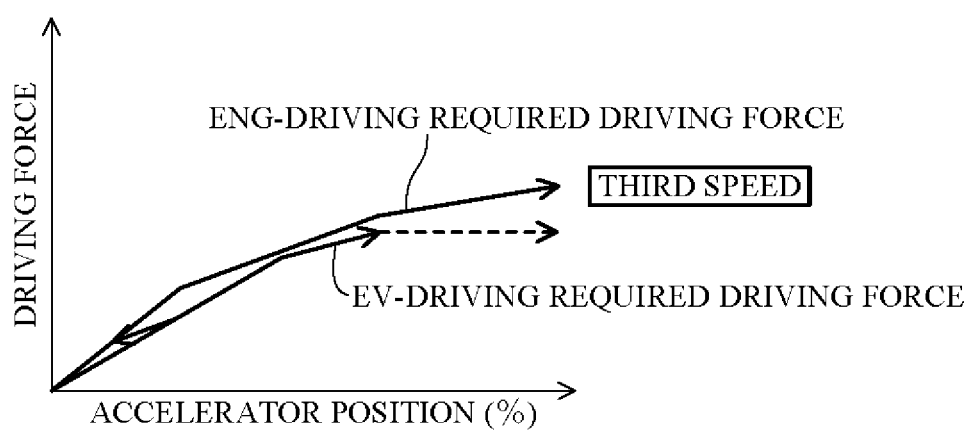
FIG. 6 is an explanatory diagram showing required driving force characteristics of the engine and the motor with respect to the accelerator position shown in FIG. 5 time chart.

FIG. 5 is an explanatory diagram at the time of implementing transition control toward the after-switching ENG-driving required driving force from when accelerator position AP starts to change in the decrease direction at time t2. In this case, required driving force falls owing to decreased accelerator position AP by the operator, so that required driving force is transitioned from EV-driving required driving force to ENG-driving required driving force while the driving force maintained at the EV-driving required driving force is being decreased at a rate equal to or smaller than the decrease rate of the ENG-driving required driving force whose characteristic is shown in FIG. 6.

Figure 7:
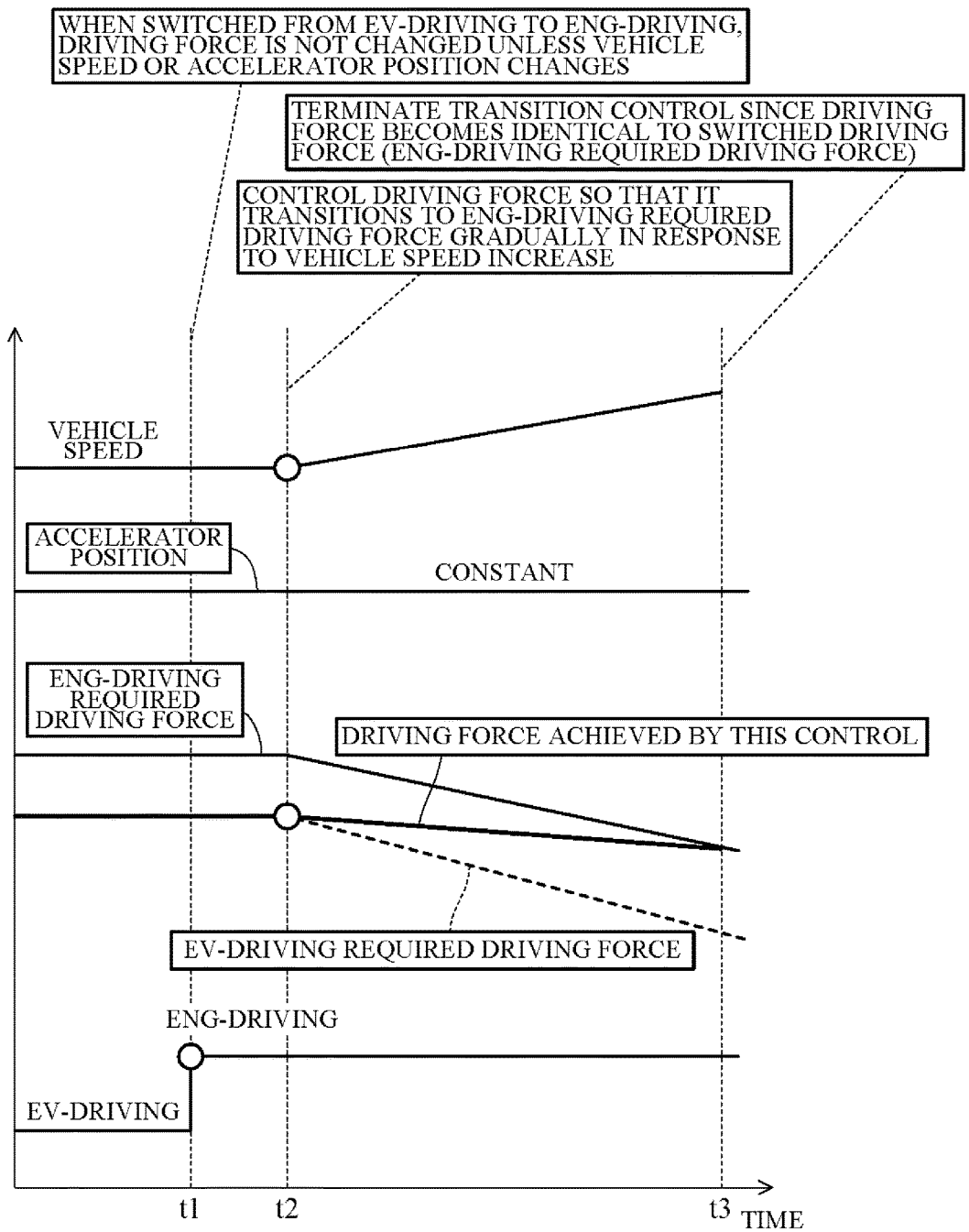
FIG. 7 is a time chart showing overview of driving force transition at the time of switching from EV-driving to ENG-driving in the apparatus shown in FIG. 1.
Figure 8:
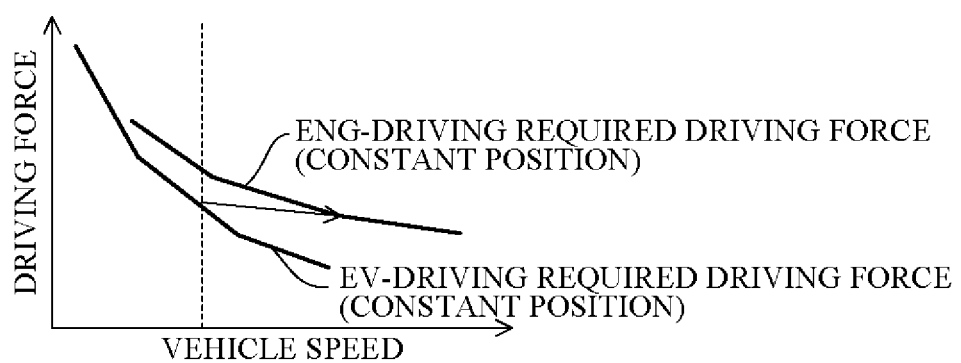
FIG. 8 is an explanatory diagram showing required driving force characteristics of the engine and the motor with respect to a vehicle speed shown in FIG. 7 time chart.

FIG. 7 is an explanatory diagram at the time of implementing transition control toward the after-switching ENG-driving required driving force from when vehicle speed V starts to change in the increase direction at time t2. In this case, required driving force falls owing to increased vehicle speed V, so that required driving force is transitioned from EV-driving required driving force to ENG-driving required driving force while the driving force maintained at the EV-driving required driving force is being decreased at a rate equal to or smaller than the decrease rate of the ENG-driving required driving force whose characteristic is shown in FIG. 8.

Figure 9:
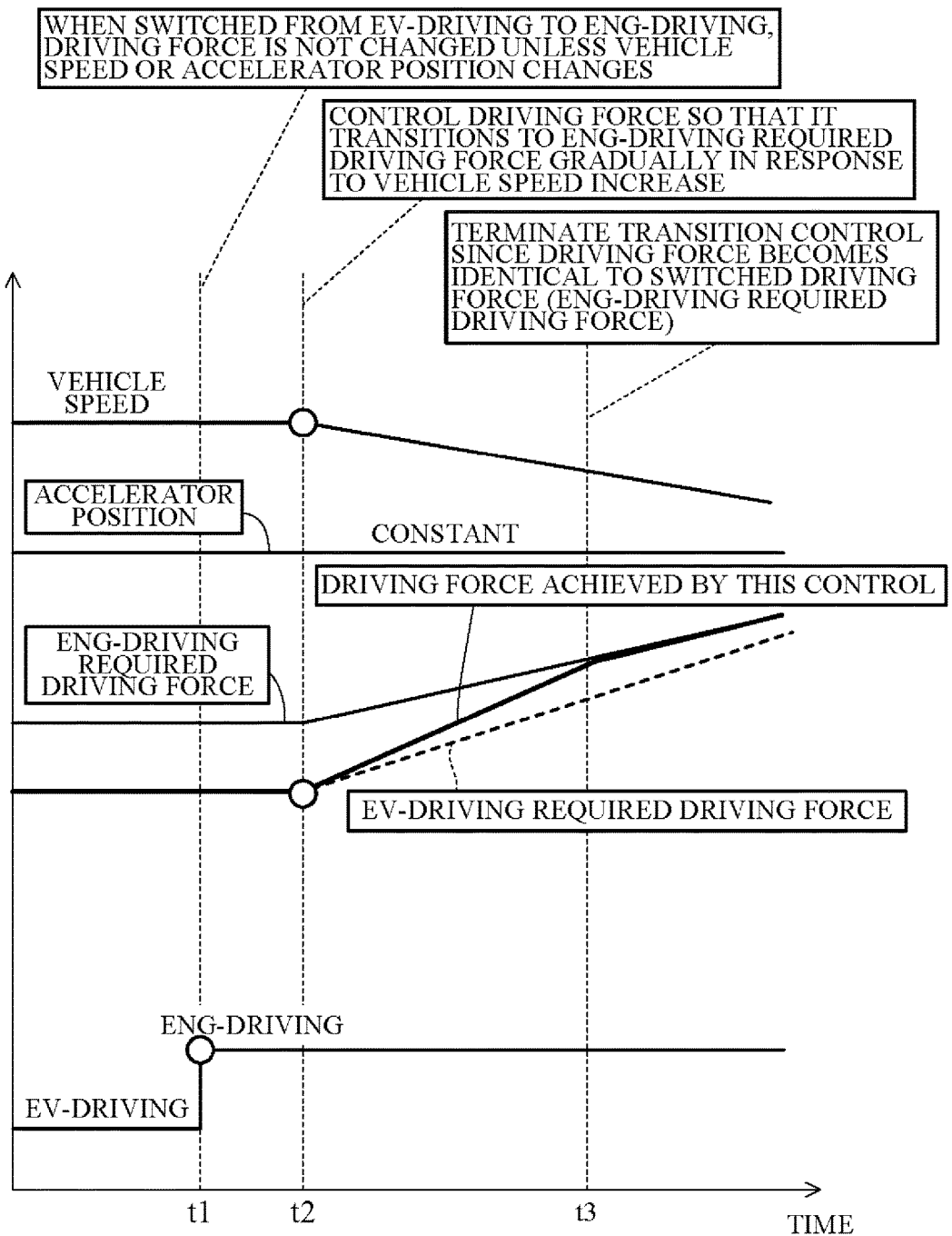
FIG. 9 is a time chart showing overview of driving force transition at the time of switching from EV-driving to ENG-driving in the apparatus shown in FIG. 1.
Figure 10:
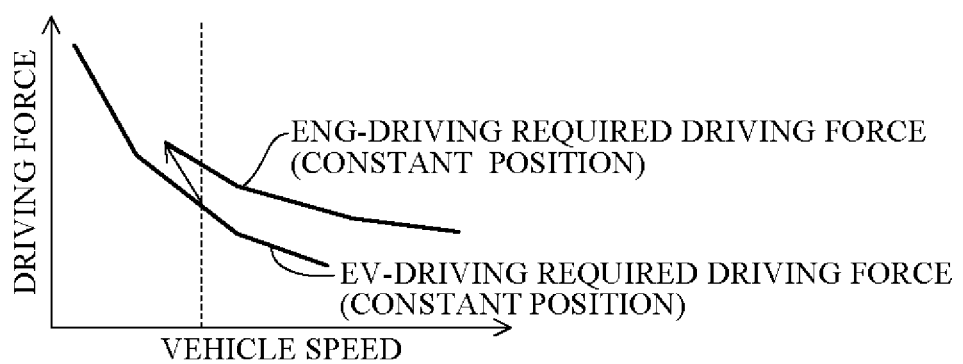
FIG. 10 is an explanatory diagram showing required driving force characteristics of the engine and the motor with respect to the vehicle speed shown in FIG. 9 time chart.

FIG. 9 is an explanatory diagram at the time of implementing transition control toward the after-switching ENG-driving required driving force from when vehicle speed V starts to change in the decrease direction at time t2. In this case, required driving force increases owing to decreased vehicle speed V, so that required driving force is transitioned from EV-driving required driving force to ENG-driving required driving force while the driving force maintained at the EV-driving required driving force is being increased at a rate equal to or greater than the increase rate of the ENG-driving required driving force whose characteristic is shown in FIG. 10.

Now follows an explanation of the driving force transition rate calculation processing of S18 of the flowchart of FIG. 2.

Figure 11:
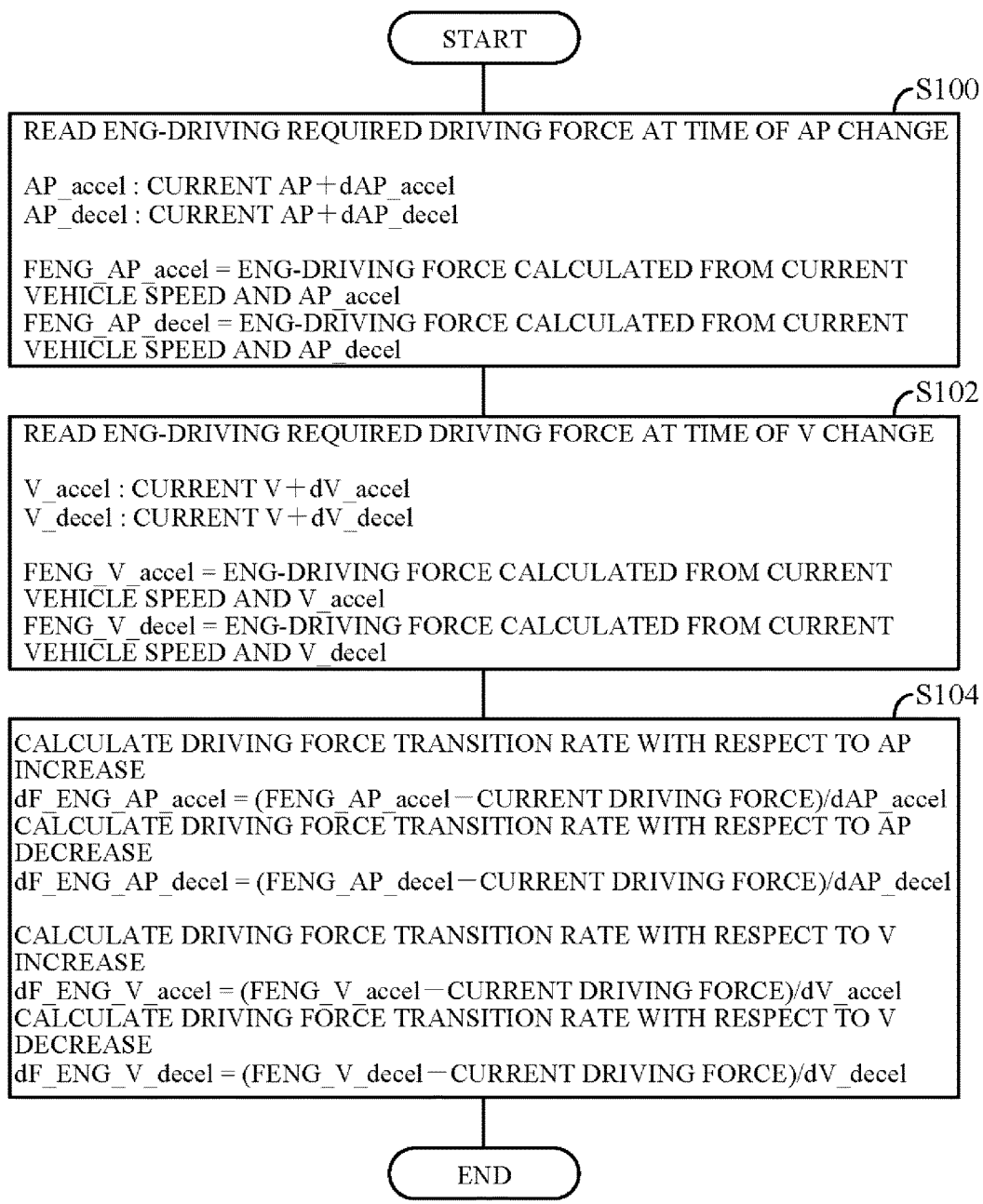
FIG. 11 is a subroutine flowchart showing a driving force transition rate calculation processing of FIG. 2 flowchart.
Figure 12:
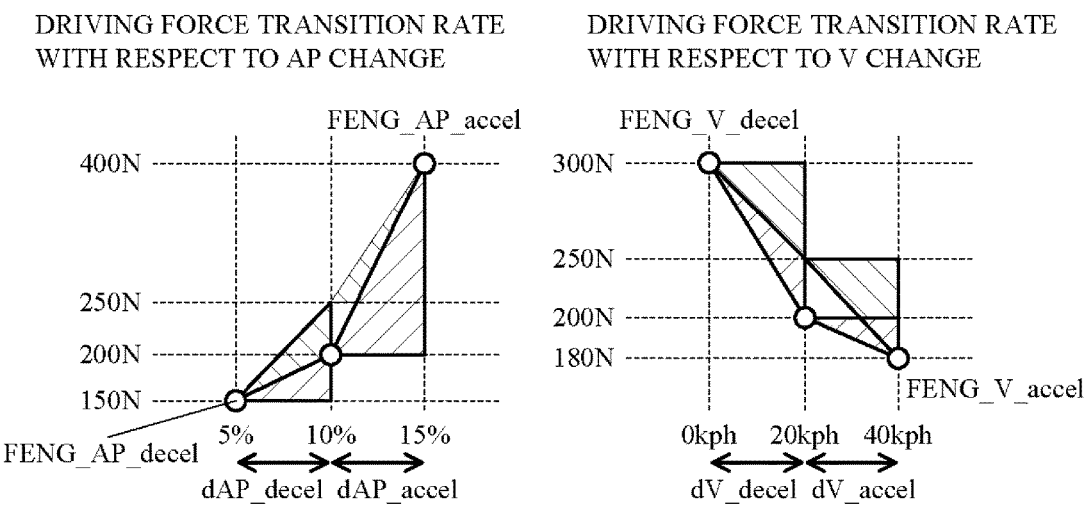
FIG. 12 is an explanatory diagram of processing of FIG. 11 flowchart.

FIG. 11 is a subroutine flowchart showing this processing, and FIG. 12 is an explanatory diagram of the processing of FIG. 12.

Turning to an explanation with reference to FIG. 11, in S100, ENG-driving required driving force at time of AP change is read. In an ENG-driving force map such as shown on the left side of FIG. 12, increase dAP_accel or decrease dAP_decel from current accelerator position AP (current AP) with increase-decrease direction change is added to calculate AP_accel or AP_decel, and ENG-driving force FENG_AP_accel or FENG_AP_decel is calculated from these and current vehicle speed.

Next, in S102, ENG-driving required driving force at time of vehicle speed V change is read. Specifically, in an ENG-driving force map such as shown on the right side of FIG. 12, increase dV_accel or decrease dV_decel from current vehicle speed V (current V) with increase-decrease direction change is added to calculate V_accel or V_decel, and ENG-driving force FENG_V_accel or FENG_V_decel is calculated from these and current vehicle speed.

Next, in S104, difference obtained by subtracting current driving force from ENG-driving force FENG_AP_accel or FENG_AP_decel is divided by dAP_accel or dAP_decel to calculate driving force transition rate dF_ENG_AP_accel or dF_ENG_AP_decel with respect to increase or decrease of accelerator position AP.

Similarly, difference obtained by subtracting current driving force from ENG-driving force FENG_V_accel or FENG_V_decel is divided by dV_accel or dV_decel to calculate driving force transition rate dF_ENG_V_accel or dF_ENG_V_decel with respect to increase or decrease of vehicle speed V.

As shown in FIG. 12, the amounts of increase or decrease dAP and dV are parameters that determine within what percentage of change to the accelerator position AP or within how many km change in the vehicle speed V the driving force should be returned to the normal driving force and are defined in advance in accordance with the desired characteristics of the vehicle 1.

Returning to the explanation of the flowchart of FIG. 2, when the result in S14 is NO, EV-driving is in progress, i.e., that ENG-driving is switched to EV-driving is determined, so that the program goes to S22, in which it is determined whether current driving force, i.e., required driving force calculated from accelerator position AP and vehicle speed V in accordance with the predetermined characteristics, is in agreement with EV-driving required driving force.

When the result in S22 is NO, the program goes to S24, in which driving force transition rate (driving force increase/decrease rate) is calculated from the current driving force and an EV-driving force map, and goes to S26, in which driving force transition control is performed in accordance with the calculated driving force transition rate. On the other hand, when the result in S22 is YES, meaning that completion of such transition control is determined, subsequent processing is skipped.

Figure 13:
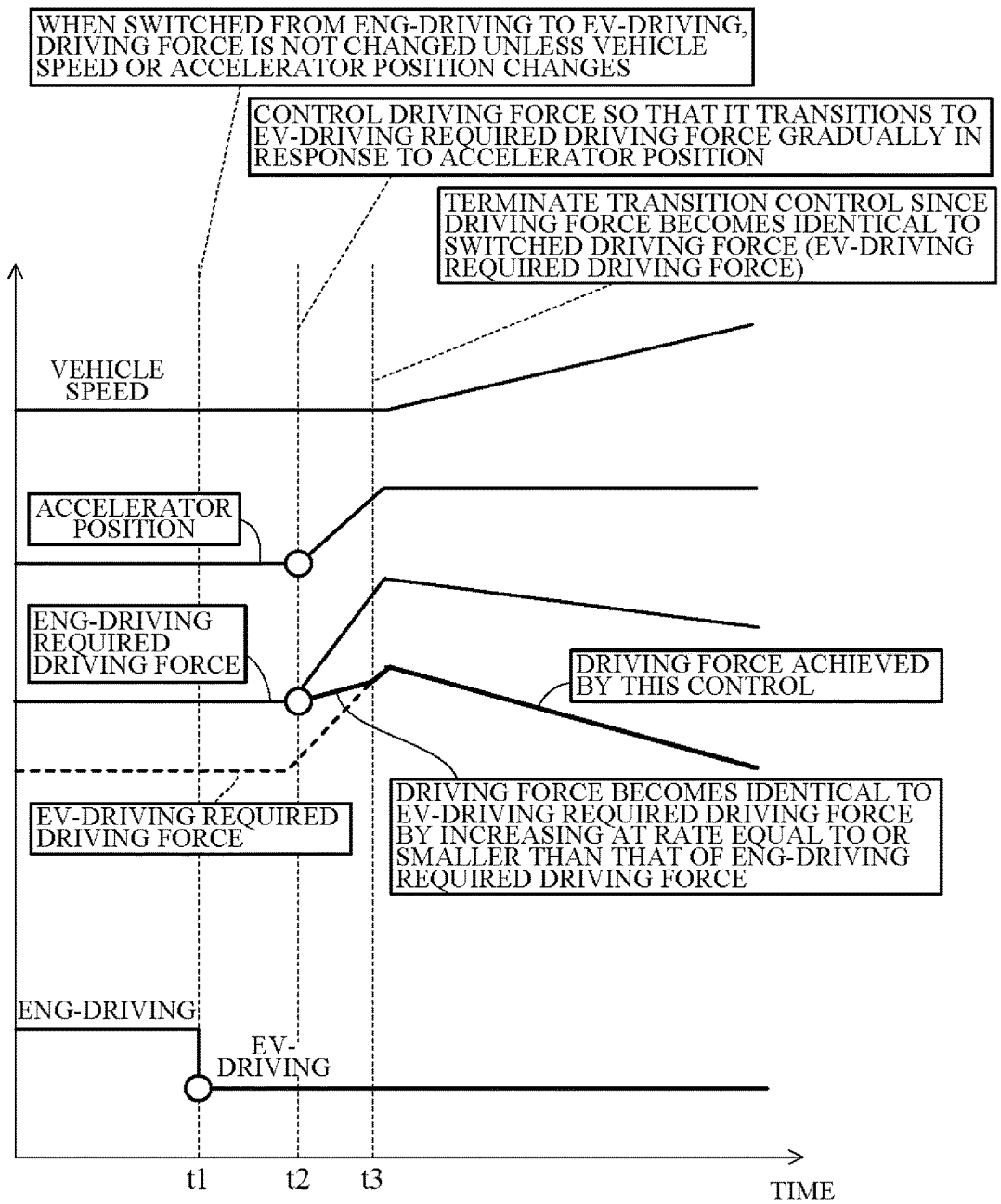
FIG. 13 is a time chart showing overview of driving force transition at the time of switching from ENG-driving to EV-driving in the apparatus shown in FIG. 1.

FIG. 13 is a time chart showing an overview of driving force transition at the time mode is switched from ENG-driving to EV-driving.

Figure 14:
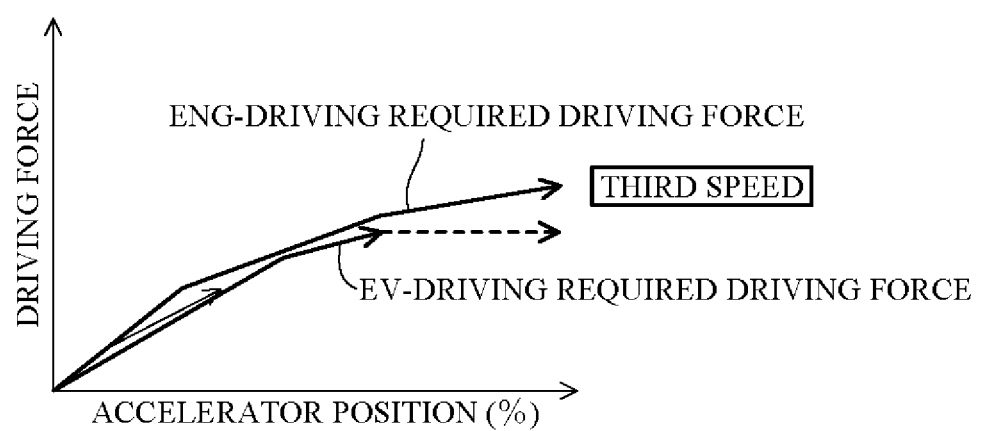
FIG. 14 is an explanatory diagram showing required driving force characteristics of the engine and the motor with respect to the accelerator position shown in FIG. 13 time chart.

In the case of FIG. 13, required driving force increases owing to increased accelerator position AP by the operator, so that, as shown in FIGS. 13 and 14, required driving force is transitioned from ENG-driving required driving force to EV-driving required driving force while the driving force maintained at the EV-driving required driving force is being increased at a rate equal to or smaller than the increase rate of the ENG-driving required driving force.

Figure 15:
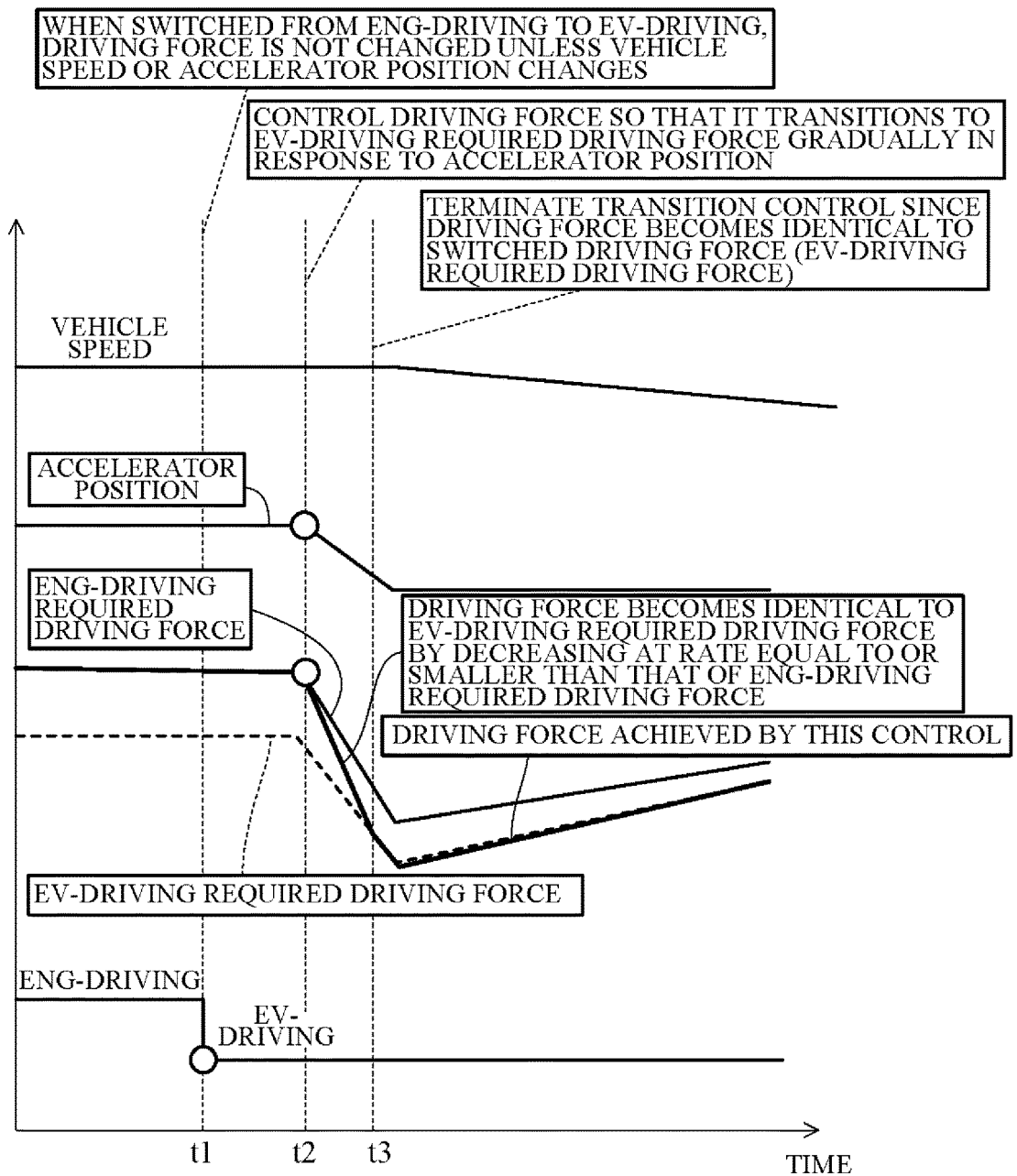
FIG. 15 is a time chart showing overview of driving force transition at the time of switching from ENG-driving to EV-driving in the apparatus shown in FIG. 1.
Figure 16:
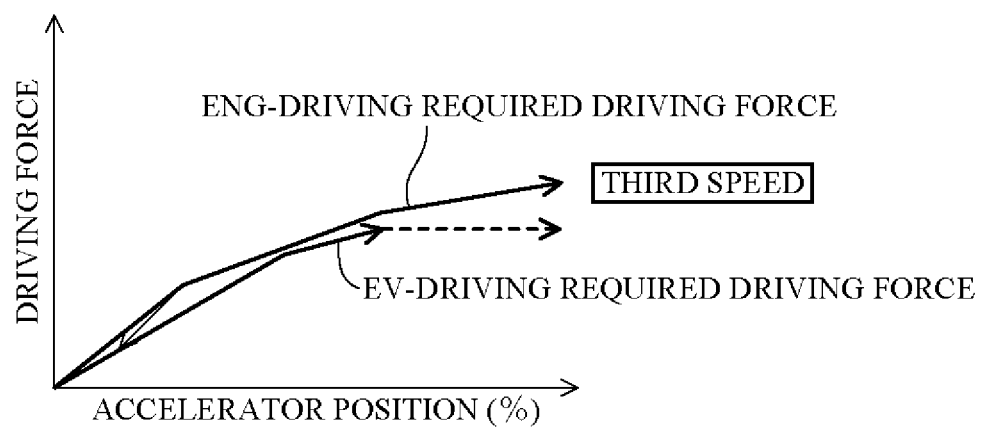
FIG. 16 is an explanatory diagram showing required driving force characteristics of the engine and the motor with respect to the accelerator position shown in FIG. 15 time chart.

In the case of FIG. 15, required driving force decreases owing to decreased accelerator position AP by the operator, so that, as shown in FIGS. 15 and 16, required driving force is transitioned from ENG-driving required driving force to EV-driving required driving force while the driving force maintained at the EV-driving required driving force is being decreased at a rate equal to or greater than the decrease rate of the ENG-driving required driving force.

Figure 17:
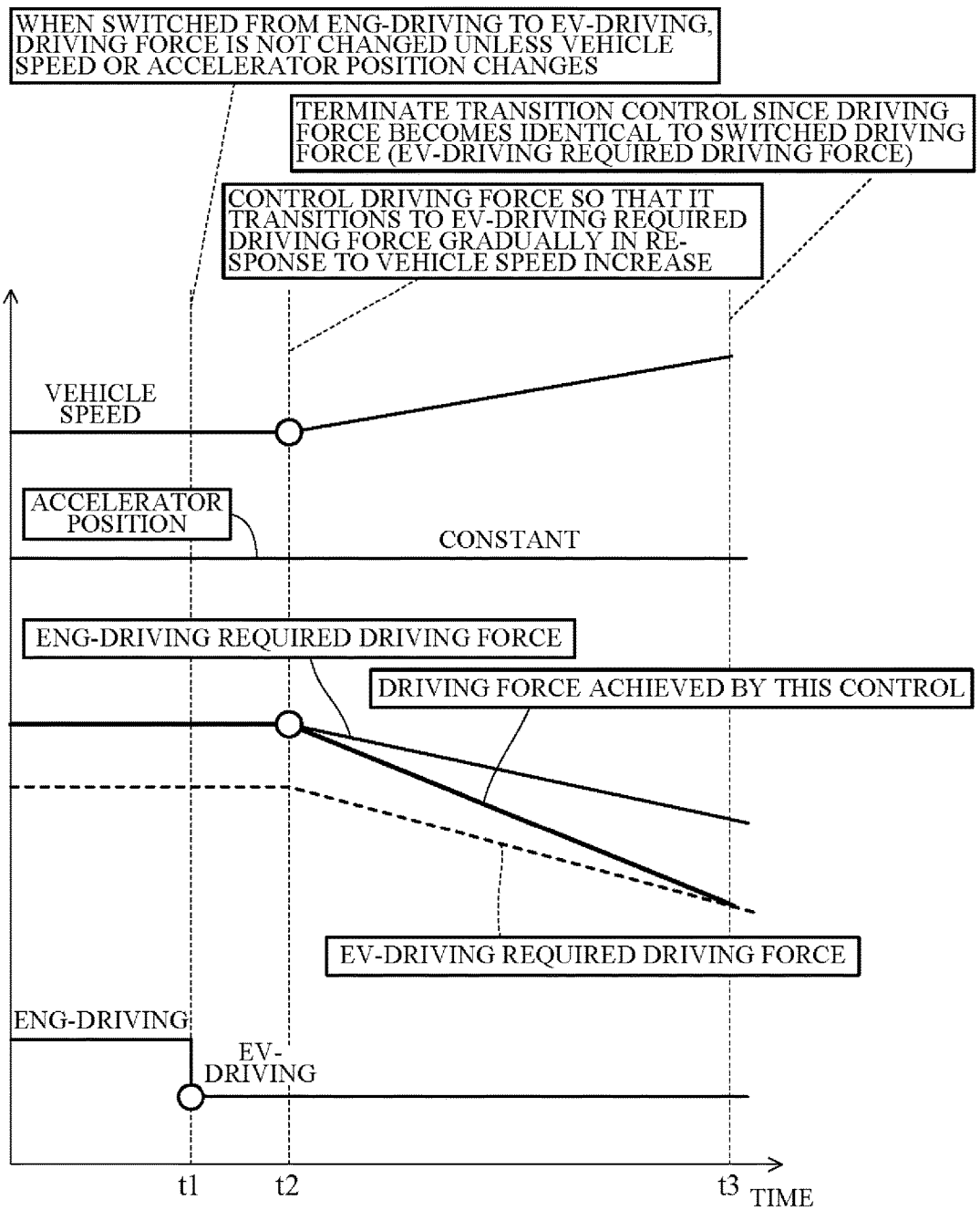
FIG. 17 is a time chart showing overview of driving force transition at the time of switching from ENG-driving to EV-driving in the apparatus shown in FIG. 1.
Figure 18:
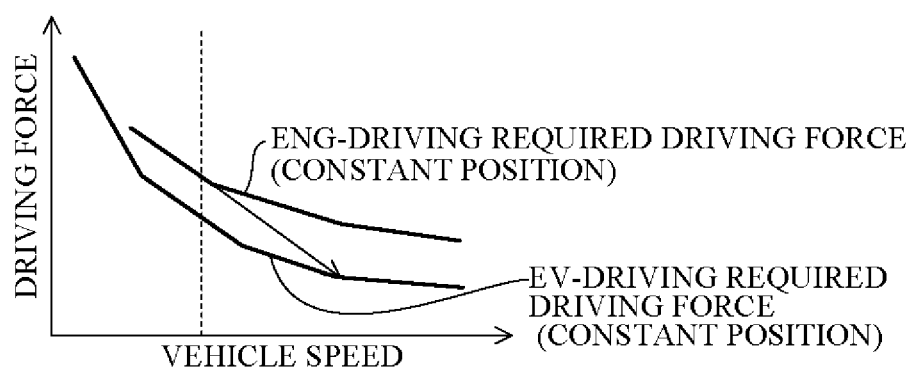
FIG. 18 is an explanatory diagram showing required driving force characteristics of the engine and the motor with respect to the vehicle speed shown in FIG. 17 time chart.

In the case of FIG. 17, required driving force decreases owing to increased vehicle speed V, so that required driving force is transitioned from ENG-driving required driving force to EV-driving required driving force while the driving force maintained at the EV-driving required driving force is being decreased at a rate equal to or smaller than the decrease rate of the ENG-driving required driving force whose characteristic is shown in FIG. 18.

Figure 19:
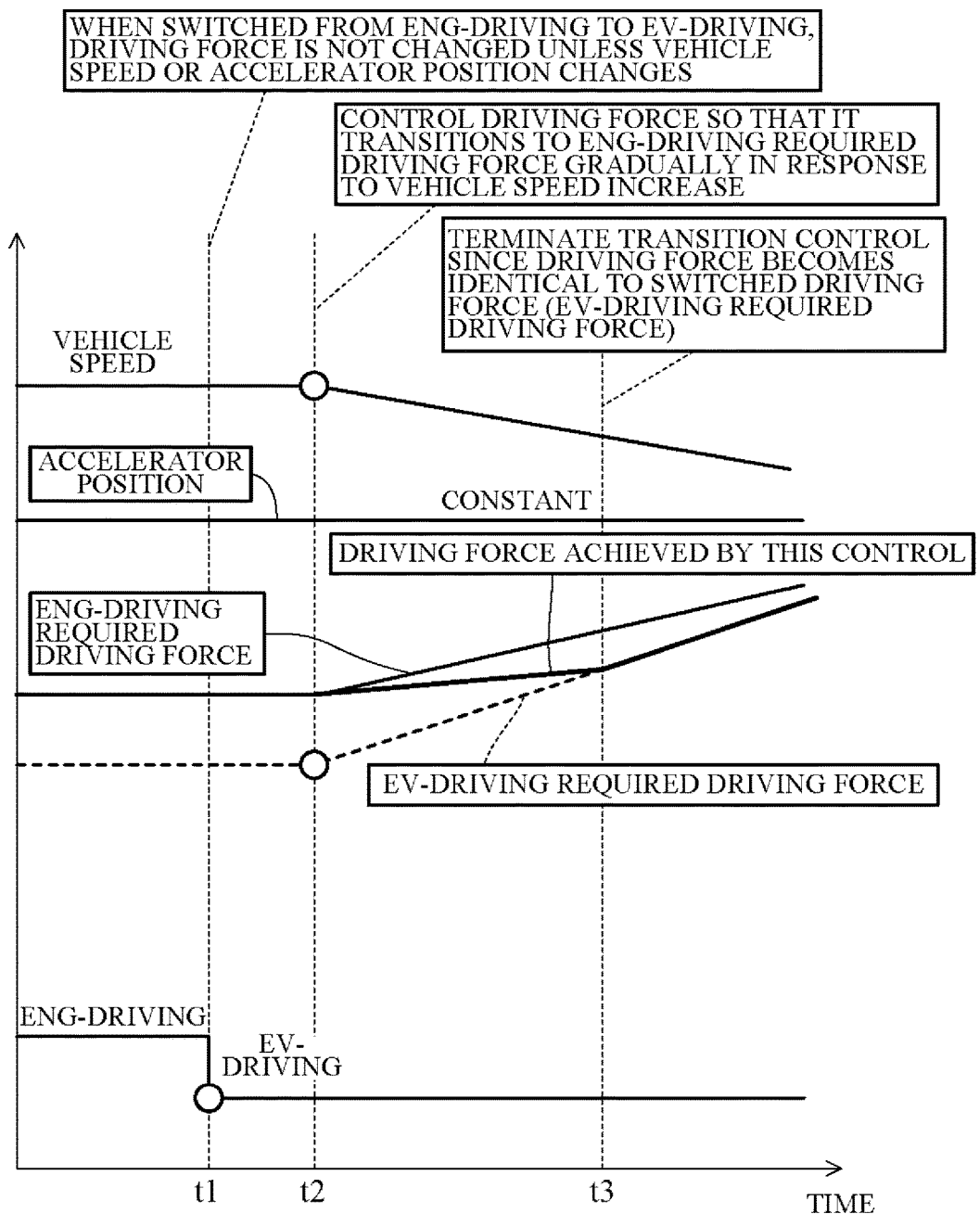
FIG. 19 is a time chart showing overview of driving force transition at the time of switching from ENG-driving to EV-driving in the apparatus shown in FIG. 1.
Figure 20:
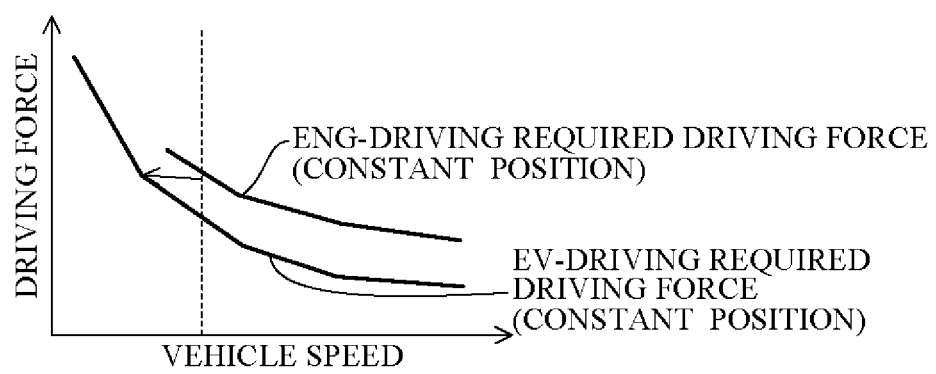
FIG. 20 is an explanatory diagram showing required driving force characteristics of the engine and the motor with respect to the vehicle speed shown in FIG. 19 time chart.

In the case of FIG. 19, required driving force increases owing to decreased vehicle speed V, so that, as shown in FIGS. 19 and 20, required driving force is transitioned from ENG-driving required driving force to EV-driving required driving force while the driving force maintained at the EV-driving required driving force is being increased at a rate equal to or smaller than the increase rate of the ENG-driving required driving force.

Returning to the flowchart of FIG. 2, the driving force transition rate calculation processing of S24 of the flowchart of FIG. 2 is explained next.

Figure 21:
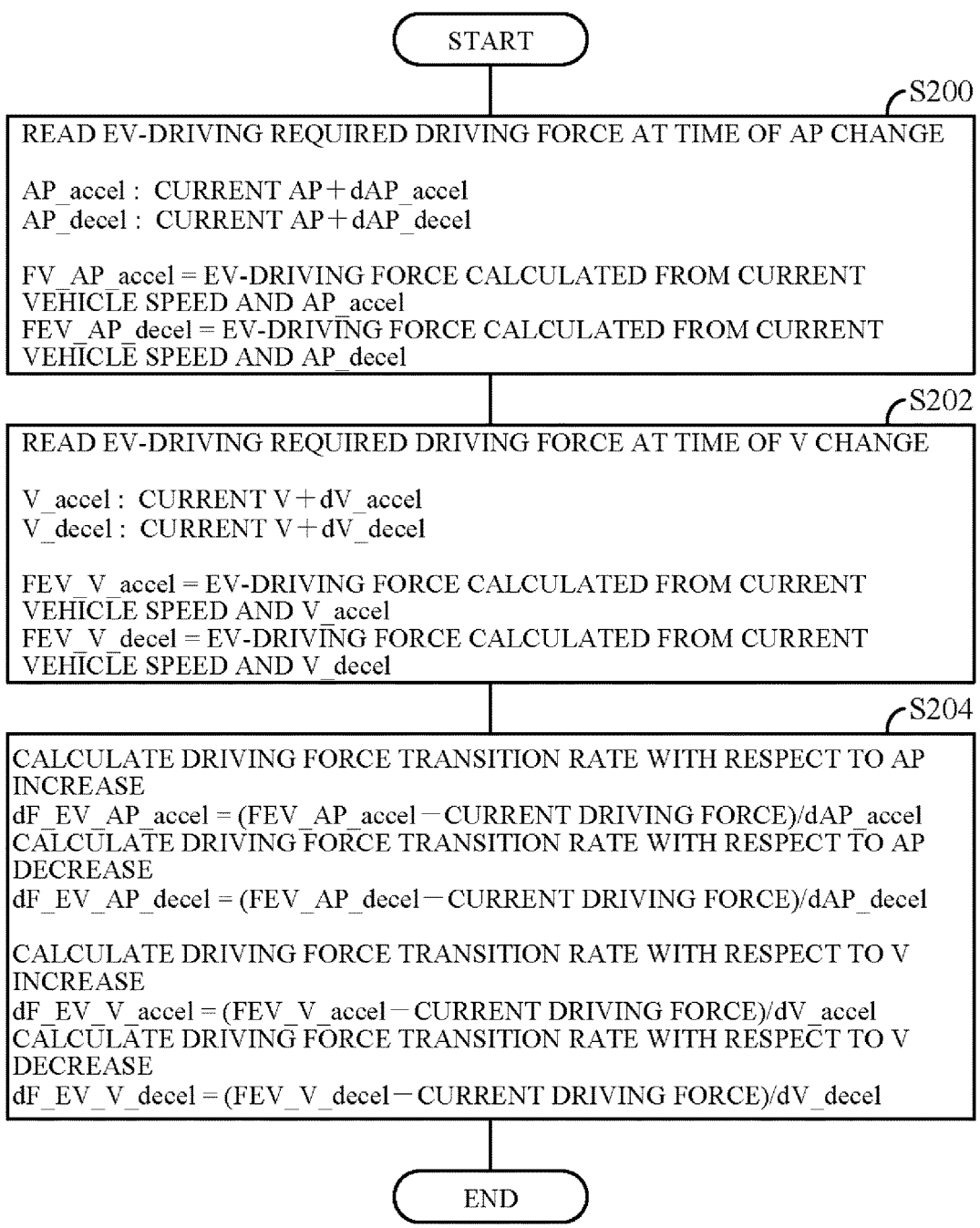
FIG. 21 is a subroutine flowchart showing a driving force transition rate calculation processing of FIG. 2 flowchart.

FIG. 21 is a subroutine flowchart showing this processing.

Turning to an explanation with reference to FIG. 21, in S200, EV-driving required driving force at time of AP change is read. Specifically, in an EV-driving force map similar to an ENG-driving force map such as shown on the left side of FIG. 12, increase dAP_accel or decrease dAP_decel from current accelerator position AP (current AP) with increase-decrease direction change is added to calculate AP_accel or AP_decel, and EV-driving force FEV_AP_accel or FEV_AP_decel is calculated from these and current vehicle speed.

Next in S202, EV-driving required driving force at time of vehicle speed V change is read. Specifically, in an EV-driving force map similar to an ENG-driving force map such as shown on the right side of FIG. 12, increase dV_accel or decrease dV_decel from current vehicle speed V (current V)

with increase-decrease direction change is added to calculate V_accel or V_decel, and EV-driving force FEV_V_accel or FEV_V_decel is calculated from these and current vehicle speed.

Next, in S204, difference obtained by subtracting current driving force from EV-driving force FEV_AP_accel or FEV_AP_decel is divided by dAP_accel or dAP_decel to calculate driving force transition rate dF_EV_AP_accel or dF_EV_AP_decel with respect to increase or decrease of accelerator position AP.

Similarly, difference obtained by subtracting current driving force from EV-driving force FEV_V_accel or FEV_V_decel is divided by dV_accel or dV_decel to calculate driving force transition rate dF_EV_V_accel or dF_EV_V_decel with respect to increase or decrease of vehicle speed V.

Figure 22:
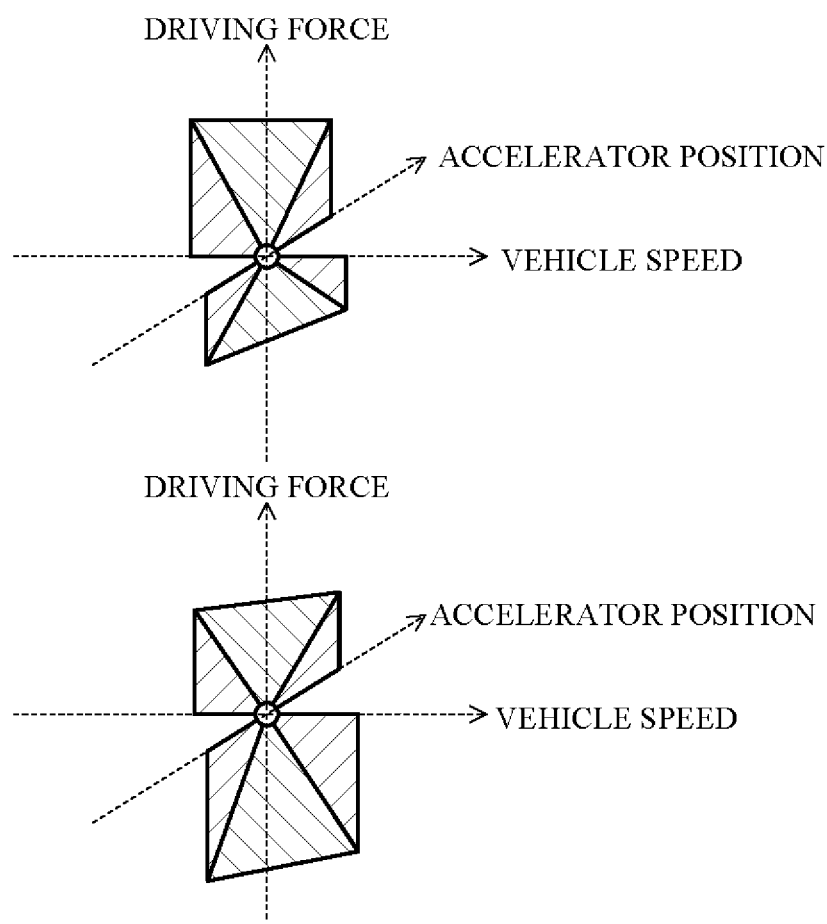
FIG. 22 is an explanatory diagram for explaining processing of FIG. 11 and FIG. 21 flowchart.

In the processing of S18 or S24 of FIG. 2, driving force is transitioned (switched) in accordance with change of accelerator position AP and vehicle speed V, but actually both of these usually change simultaneously, so that it is preferable, as shown in FIG. 22, to treat changes in accelerator position AP and vehicle speed V as three-dimensional figures and calculate transition rate by linear interpolation.

As stated above, this embodiment is configured to have a control apparatus for a hybrid vehicle (1) mounted with an internal combustion engine (engine) 10 and a rotating electrical machine (motor) 12 as onboard power sources, having a mode switching unit or switching means (engine control unit) 26 that switches driving mode of the vehicle between driving modes including engine (ENG) driving mode in which driving is to be powered by the engine and electrical machine (EV) driving mode in which driving is to be powered by the rotating electrical machine in accordance with predetermined switching conditions; and a driving force control unit or control means (engine control unit) 26 that calculates required driving force (ENG-driving required driving force, EV-driving required driving force) in each of the engine driving mode and the electrical machine driving mode in accordance with predetermined characteristics based on accelerator position AP and vehicle speed V and controls the driving force of the vehicle 1 to the calculated required driving force; wherein the driving force control unit controls the driving force of the vehicle, when the driving mode is switched by the mode switching unit, based on the required driving force of the driving mode before switched unless at least one of the accelerator position AP and the vehicle speed V changes (S10-S26).

In this embodiment, it is configured to control the driving force of the vehicle 1 based on the required driving force of the driving mode before switched unless at least one of the accelerator position AP and the vehicle speed V changes when the driving mode is switched. With this, by controlling driving force of the vehicle based on the required driving force of the driving mode before switched unless at least one of the accelerator position and vehicle speed changes, in other words, by controlling driving force of the vehicle 1 based on the required driving force of the driving mode after switched when at least one of the accelerator position and vehicle speed changes, it becomes possible to decrease any unnatural feeling given to the operator by change in vehicle driving force accompanying required driving force change driving mode switching.

Specifically, since the change of accelerator position AP must be caused by the operator's accelerator manipulation and the operator must feel the change of vehicle speed V by himself/herself, by changing the required driving force when at least one of the accelerator position and vehicle speed changes, it becomes possible to decrease unnatural feeling given to the operator even when the driving forces generated by the internal combustion engine (engine) 10 and the rotating electrical machine (motor) 12 are not equal even though the vehicle speed and accelerator position are the same so that the driving force of the vehicle 1 changes due to change in the required driving force.

In the apparatus, the driving force control unit gradually changes the driving force of the vehicle towards the required driving force of the driving mode after switched when at least one of the accelerator position AP and the vehicle speed V changes (S14, S16, S18, S20, S22, S24, S26). With this, it becomes possible to further decrease any unnatural feeling given to the operator.

In the apparatus, the driving force control unit gradually changes the driving force of the vehicle towards the required driving force of the driving mode after switched by an increase/decrease rate (driving force transition rate) obtained as an increase/decrease rate (dF_ENG, dF_EV) of the required driving force of the engine (ENG) driving mode (ENG-driving required driving force) when at least one of the accelerator position AP and the vehicle speed (V) changes (S14, S16, S18, S20, S22, S24, S26). With this, it becomes possible to make the driving force coincide with the required driving force after switched and accordingly, further decrease any unnatural feeling given to the operator.

In the apparatus, the driving force control unit increases the required driving force of the electrical machine driving mode by a rate equal to or greater than an increase rate of the required driving force of the engine driving mode, assuming that the required driving force of the engine driving mode is greater than the required driving force of the electrical machine driving mode, if the accelerator position AP changes in increase direction when the driving mode is switched from the electrical machine driving mode to the engine driving mode by the mode switching unit, so as to gradually change the driving force of the vehicle towards the required driving force of the engine driving mode (S16, S18, S20, FIG. 3). With this, it becomes possible to further decrease any unnatural feeling given to the operator.

In the apparatus, the driving force control unit decreases the required driving force of the electrical machine driving mode by a rate equal to or smaller than a decrease rate of the required driving force of the engine driving mode, assuming that the required driving force of the engine driving mode is greater than the required driving force of the electrical machine driving mode, if the accelerator position AP changes in decrease direction when the driving mode is switched from the electrical machine driving mode to the engine driving mode by the mode switching unit, so as to gradually change the driving force of the vehicle towards the required driving force of the engine driving mode (S16, S18, S20, FIG. 5). With this, it becomes possible to further decrease any unnatural feeling given to the operator.

In the apparatus, the driving force control unit decreases the required driving force of the electrical machine driving mode by a rate equal to or smaller than a decrease rate of the required driving force of the engine driving mode, assuming that the required driving force of the engine driving mode is greater than the required driving force of the electrical machine driving mode, if the vehicle speed V changes in increase direction when the driving mode is switched from the electrical machine driving mode to the engine driving mode by the mode switching unit, so as to gradually change the driving force of the vehicle towards the required driving force of the engine driving mode (S16, S18, S20, FIG. 7).

With this, it becomes possible to further decrease any unnatural feeling given to the operator.

In the apparatus, the driving force control unit increases the required driving force of the electrical machine driving mode by a rate equal to or greater than an increase rate of the required driving force of the engine driving mode, assuming that the required driving force of the engine driving mode is greater than the required driving force of the electrical machine driving mode, if the vehicle speed V changes in decrease direction when the driving mode is switched from the electrical machine driving mode to the engine driving mode by the mode switching unit, so as to gradually change the driving force of the vehicle towards the required driving force of the engine driving mode (S16, S18, S20, FIG. 9). With this, it becomes possible to further decrease any unnatural feeling given to the operator.

In the apparatus, the driving force control unit increases the required driving force of the electrical machine driving mode by a rate equal to or smaller than an increase rate of the required driving force of the engine driving mode, assuming that the required driving force of the engine driving mode is greater than the required driving force of the electrical machine driving mode, if the accelerator position AP changes in increase direction when the driving mode is switched from the engine driving mode to the electrical machine driving mode by the mode switching unit, so as to gradually change the driving force of the vehicle towards the required driving force of the electrical machine driving mode (S14, S22, S24, S26, FIG. 13). With this, it becomes possible to further decrease any unnatural feeling given to the operator.

In the apparatus, the driving force control unit decreases the required driving force of the electrical machine driving mode by a rate equal to or greater than a decrease rate of the required driving force of the engine driving mode, assuming that the required driving force of the engine driving mode is greater than the required driving force of the electrical machine driving mode, if the accelerator position AP changes in decrease direction when the driving mode is switched from the engine driving mode to the electrical machine driving mode by the mode switching unit, so as to gradually change the driving force of the vehicle towards the required driving force of the electrical machine driving mode (S14, S22, S24, S26, FIG. 15). With this, it becomes possible to further decrease any unnatural feeling given to the operator.

In the apparatus, the driving force control unit decreases the required driving force of the electrical machine driving mode by a rate equal to or greater than a decrease rate of the required driving force of the engine driving mode, assuming that the required driving force of the engine driving mode is greater than the required driving force of the electrical machine driving mode, if the vehicle speed V changes in increase direction when the driving mode is switched from the engine driving mode to the electrical machine driving mode by the mode switching unit, so as to gradually change the driving force of the vehicle towards the required driving force of the electrical machine driving mode (S14, S22, S24, S26, FIG. 17). With this, it becomes possible to further decrease any unnatural feeling given to the operator.

In the apparatus, the driving force control unit increases the required driving force of the electrical machine driving mode by a rate equal to or smaller than an increase rate of the required driving force of the engine driving mode, assuming that the required driving force of the engine driving mode is greater than the required driving force of the electrical machine driving mode, if the vehicle speed V changes in decrease direction when the driving mode is switched from the engine driving mode to the electrical machine driving mode by the mode switching unit, so as to gradually change the driving force of the vehicle towards the required driving force of the electrical machine driving mode (S14, S22, S24, S26, FIG. 19). With this, it becomes possible to further decrease any unnatural feeling given to the operator.

In the above, although the invention is explained taking an example in which the driving mode is switched between the ENG-driving mode and the EV-driving mode, it becomes possible to apply the invention to a case in which the driving mode is switched among ENG-driving mode, the EV-driving mode and hybrid-driving mode.

While the present invention has been described with reference to the preferred embodiments thereof, it will be understood, by those skilled in the art, that various changes and modifications may be made thereto without departing from the scope of the appended claims.

What is claimed is:

1. A control apparatus for a hybrid vehicle mounted with an internal combustion engine and a rotating electrical machine as onboard power sources, having:
   a mode switching unit that switches driving mode of the vehicle between driving modes including engine driving mode in which driving is to be powered by the engine and electrical machine driving mode in which driving is to be powered by the rotating electrical machine in accordance with predetermined switching conditions; and
   a driving force control unit that calculates required driving force in each of the engine driving mode and the electrical machine driving mode in accordance with predetermined characteristics based on accelerator position and vehicle speed and controls the driving force of the vehicle to the calculated required driving force;
   wherein the driving force control unit controls the driving force of the vehicle, when the driving mode is switched by the mode switching unit, based on the required driving force of the driving mode before switched unless at least one of the accelerator position and the vehicle speed changes;
   wherein the driving force control unit gradually changes the driving force of the vehicle towards the required driving force of the driving mode after switched when at least one of the accelerator position and the vehicle speed changes;
   wherein the driving force control unit increases the required driving force of the electrical machine driving mode by a rate equal to or greater than an increase rate of the required driving force of the engine driving mode, assuming that the required driving force of the engine driving mode is greater than the required driving force of the electrical machine driving mode, if the accelerator position changes in an increase direction when the driving mode is switched from the electrical machine driving mode to the engine driving mode by the mode switching unit, so as to gradually change the driving force of the vehicle towards the required driving force of the engine driving mode.

2. The apparatus according to claim 1, wherein the driving force control unit gradually changes the driving force of the vehicle towards the required driving force of the driving mode after switched by an increase/decrease rate obtained as an increase/decrease rate of the required driving force of the engine driving mode when at least one of the accelerator position and the vehicle speed changes.

3. The apparatus according to claim 1, wherein the driving force control unit decreases the required driving force of the electrical machine driving mode by a rate equal to or smaller than a decrease rate of the required driving force of the engine driving mode, assuming that the required driving force of the engine driving mode is greater than the required driving force of the electrical machine driving mode, if the accelerator position changes in a decrease direction when the driving mode is switched from the electrical machine driving mode to the engine driving mode by the mode switching unit, so as to gradually change the driving force of the vehicle towards the required driving force of the engine driving mode.

4. The apparatus according to claim 1, wherein the driving force control unit decreases the required driving force of the electrical machine driving mode by a rate equal to or smaller than a decrease rate of the required driving force of the engine driving mode, assuming that the required driving force of the engine driving mode is greater than the required driving force of the electrical machine driving mode, if the vehicle speed V changes in an increase direction when the driving mode is switched from the electrical machine driving mode to the engine driving mode by the mode switching unit, so as to gradually change the driving force of the vehicle towards the required driving force of the engine driving mode.

5. The apparatus according to claim 1, wherein the driving force control unit increases the required driving force of the electrical machine driving mode by a rate equal to or greater than an increase rate of the required driving force of the engine driving mode, assuming that the required driving force of the engine driving mode is greater than the required driving force of the electrical machine driving mode, if the vehicle speed changes in a decrease direction when the driving mode is switched from the electrical machine driving mode to the engine driving mode by the mode switching unit, so as to gradually change the driving force of the vehicle towards the required driving force of the engine driving mode.

6. The apparatus according to claim 1, wherein the driving force control unit increases the required driving force of the electrical machine driving mode by a rate equal to or smaller than an increase rate of the required driving force of the engine driving mode, assuming that the required driving force of the engine driving mode is greater than the required driving force of the electrical machine driving mode, if the accelerator position changes in an increase direction when the driving mode is switched from the engine driving mode to the electrical machine driving mode by the mode switching unit, so as to gradually change the driving force of the vehicle towards the required driving force of the electrical machine driving mode.

7. The apparatus according to claim 1, wherein the driving force control unit decreases the required driving force of the electrical machine driving mode by a rate equal to or greater than a decrease rate of the required driving force of the engine driving mode, assuming that the required driving force of the engine driving mode is greater than the required driving force of the electrical machine driving mode, if the accelerator position changes in a decrease direction when the driving mode is switched from the engine driving mode to the electrical machine driving mode by the mode switching unit, so as to gradually change the driving force of the vehicle towards the required driving force of the electrical machine driving mode.

8. The apparatus according to claim 1, wherein the driving force control unit decreases the required driving force of the electrical machine driving mode by a rate equal to or greater than a decrease rate of the required driving force of the engine driving mode, assuming that the required driving force of the engine driving mode is greater than the required driving force of the electrical machine driving mode, if the vehicle speed changes in an increase direction when the driving mode is switched from the engine driving mode to the electrical machine driving mode by the mode switching unit, so as to gradually change the driving force of the vehicle towards the required driving force of the electrical machine driving mode.

9. The apparatus according to claim 1, wherein the driving force control unit increases the required driving force of the electrical machine driving mode by a rate equal to or smaller than an increase rate of the required driving force of the engine driving mode, assuming that the required driving force of the engine driving mode is greater than the required driving force of the electrical machine driving mode, if the vehicle speed changes in a decrease direction when the driving mode is switched from the engine driving mode to the electrical machine driving mode by the mode switching unit, so as to gradually change the driving force of the vehicle towards the required driving force of the electrical machine driving mode.

* * * * *